(12) United States Patent
Yang

(10) Patent No.: US 7,869,224 B1
(45) Date of Patent: Jan. 11, 2011

(54) HOUSING STRUCTURE FOR PLUGGABLE TRANSCEIVER MODULE

(75) Inventor: Haven Yang, Chung Ho (TW)

(73) Assignee: All Best Precision Technology Co., Ltd. (TW)

( * ) Notice: Subject to any disclaimer, the term of this patent is extended or adjusted under 35 U.S.C. 154(b) by 0 days.

(21) Appl. No.: 12/562,255

(22) Filed: Sep. 18, 2009

(51) Int. Cl.
*H05K 9/00* (2006.01)

(52) U.S. Cl. ............... 361/800; 361/728; 361/816; 361/730; 361/753; 361/818; 174/350; 174/351; 174/354; 439/607.2; 439/607.21; 439/607.01

(58) Field of Classification Search ......... 361/728–731, 361/752, 800, 816, 753, 799, 818; 174/350, 174/351, 354, 355, 362, 377; 439/607.01, 439/607.17, 607.18, 607.2, 607.21
See application file for complete search history.

(56) References Cited

U.S. PATENT DOCUMENTS

| | | | | |
|---|---|---|---|---|
| 5,766,041 A * | 6/1998 | Morin et al. | ........... | 439/607.19 |
| 6,534,706 B1 * | 3/2003 | Rapp et al. | ........... | 174/354 |
| 7,001,217 B2 * | 2/2006 | Bright et al. | ........... | 439/607.2 |
| 7,438,596 B2 * | 10/2008 | Phillips | ........... | 439/607.01 |
| 7,530,845 B1 * | 5/2009 | Yang | ........... | 439/607.01 |
| 7,557,306 B2 * | 7/2009 | Chen et al. | ........... | 174/382 |
| 7,583,510 B2 * | 9/2009 | Wang | ........... | 361/753 |
| 7,729,130 B1 * | 6/2010 | Bianchini | ........... | 361/816 |

* cited by examiner

*Primary Examiner*—Dameon E Levi
(74) *Attorney, Agent, or Firm*—Schmeiser, Olsen & Watts, LLP

(57) ABSTRACT

A housing structure for pluggable transceiver module includes a case being internally provided with a plurality of vertical partitioning plates, and having first protrusions provided on an upper and a lower side of a free edge at an open end of the case, and second protrusions provided on two opposite sides of a free end of each of the partitioning plates at the open end of the case; a plurality of first elastic-leaf members being clamped to the free edge of the case and having retaining holes engaged with the first protrusions; and a plurality of second elastic-leaf members being clamped to the free ends of the partitioning plates and having retaining holes engaged with the second protrusions. Therefore, the first and second elastic-leaf members are easily and securely assembled to the case and the partitioning plates via the first and second protrusions, respectively, without the need of spot welding.

5 Claims, 6 Drawing Sheets

A-A'

B

B-B'

C

HOUSING STRUCTURE FOR PLUGGABLE TRANSCEIVER MODULE

FIELD OF THE INVENTION

The present invention relates to a housing structure for pluggable transceiver module, and more particularly to a housing structure for pluggable transceiver module that allows a case and partitioning plates thereof to be easily and securely assembled with elastic-leaf members without the need of spot welding.

BACKGROUND OF THE INVENTION

As shown in FIGS. 1, 2 and 3, a conventional pluggable transceiver module has a housing structure including a case 4, a plurality of partitioning plates 41 provided in the case 4, and a plurality of elastic-leaf members 42 assembled to a free edge of the case and free ends of the partitioning plates 41 by way of spot welding. The fully assembled housing structure can be used to form a pluggable transceiver module.

While the elastic-leaf members 42 are fixedly assembled to the free edge of the case 4 and the free ends of the partitioning plates 41 by spot welding, there is not any other additional engaging or fastening element provided between them. Therefore, the elastic-leaf members 42 tend to separate from the case 4 and the partitioning plates 41 after the housing structure has been used over a period of time. Further, the spot welding also requires increased time, labor, and manufacturing procedures.

It is therefore desirable and tried by the inventor to develop an improved housing structure for a pluggable transceiver module, so that the housing structure can be easily and securely assembled without the need of spot welding.

SUMMARY OF THE INVENTION

A primary object of the present invention is to provide a housing structure for pluggable transceiver module that allows different parts thereof to be easily and securely assembled together without the need of spot welding.

To achieve the above and other objects, the housing structure for pluggable transceiver module according to a preferred embodiment of the present invention includes a case, which is internally divided into a plurality of receiving zones by vertical partitioning plates, and has a plurality of first protrusions provided on an upper and a lower side of a free edge at an open end of the case, and a plurality of second protrusions provided on two opposite sides of a free end of each of the partitioning plates at the open end of the case; a plurality of first elastic-leaf members, each of which has a clamping section for clamping to the free edge of the case and the clamping sections each has retaining holes for engaging with the first protrusions; and a plurality of second elastic-leaf members, each of which has a clamping section for clamping to the free ends of the partitioning plates and the clamping sections each has retaining holes for engaging with the second protrusions.

Therefore, the first and second elastic-leaf members can be easily and securely assembled to the case and the partitioning plates via the first and second protrusions without the need of spot welding.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
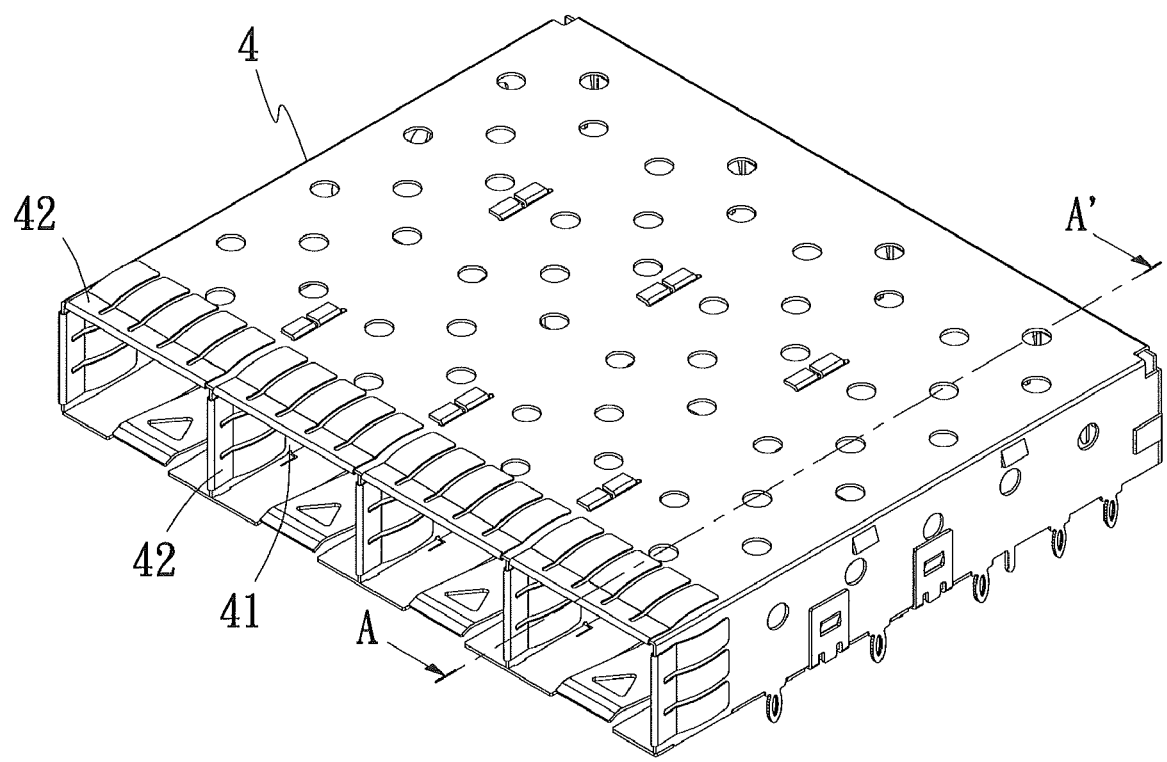
FIG. 1 is an assembled perspective view of a conventional housing structure for a pluggable transceiver module.
Figure 2:
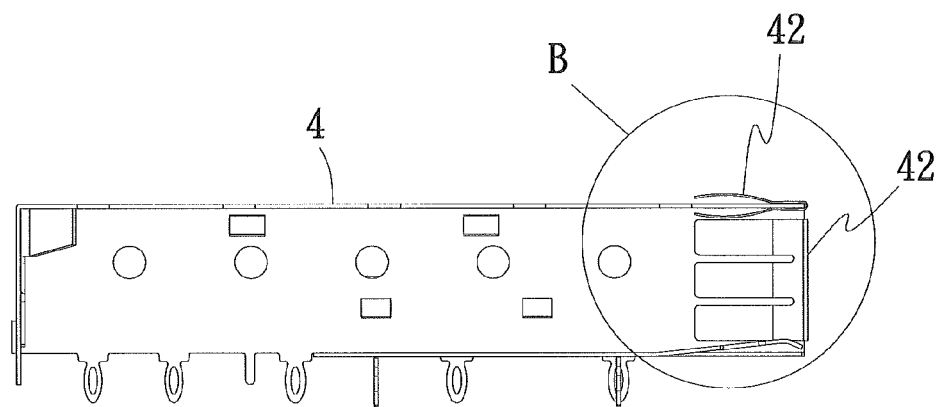
FIG. 2 is a sectional view taken along line A-A' of FIG. 1.
Figure 3:
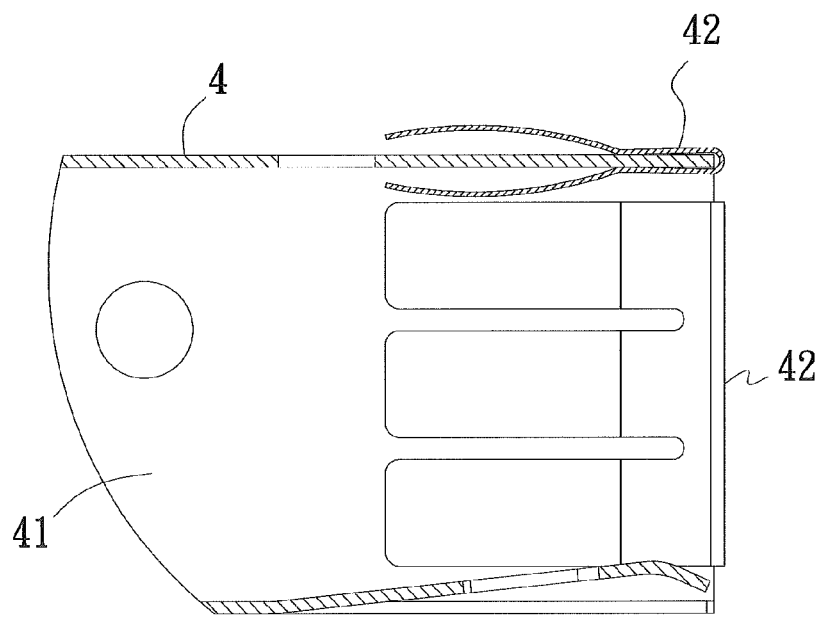
FIG. 3 is an enlarged view of the circled area B of FIG. 2.
Figure 4:
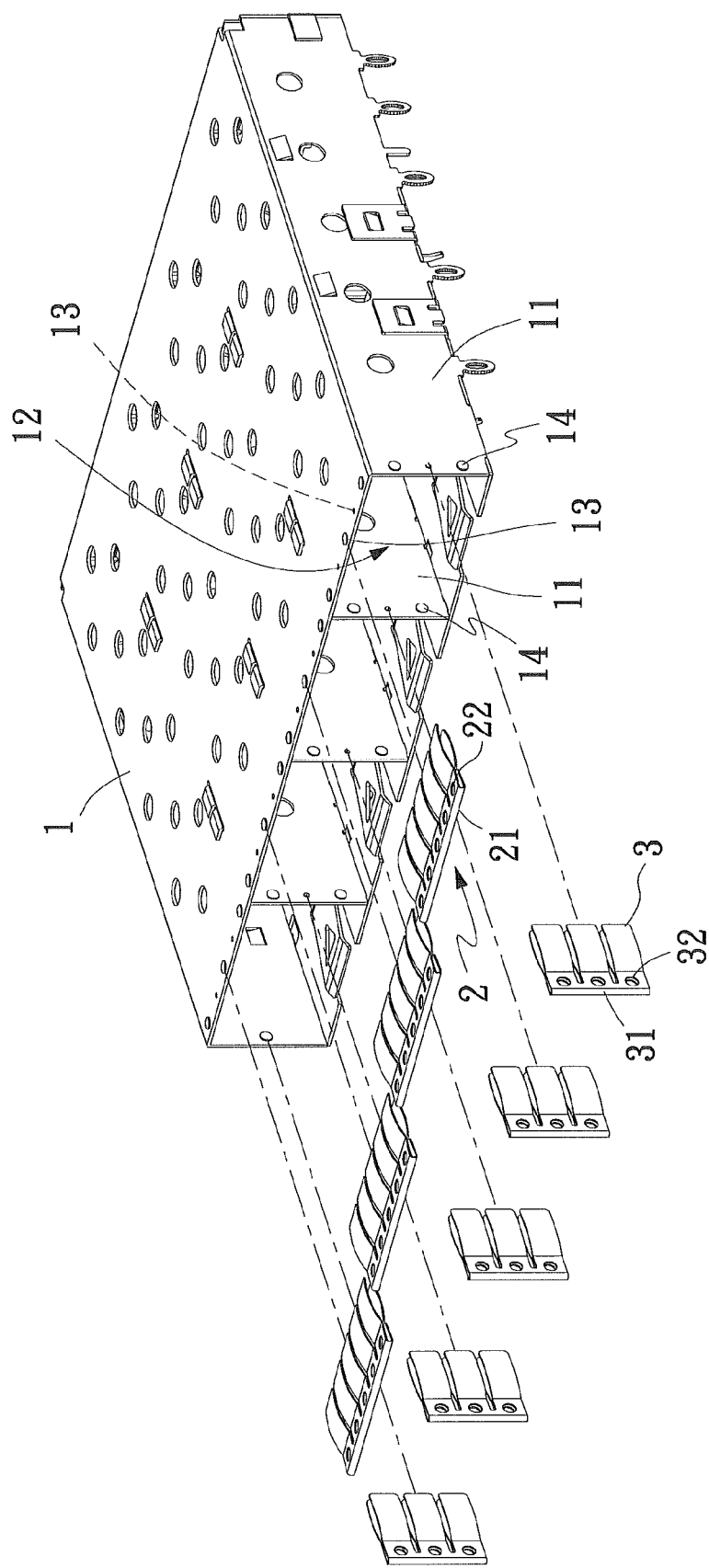
FIG. 4 is an exploded perspective view of a housing structure for pluggable transceiver module according to a first embodiment of the present invention.
Figure 5:
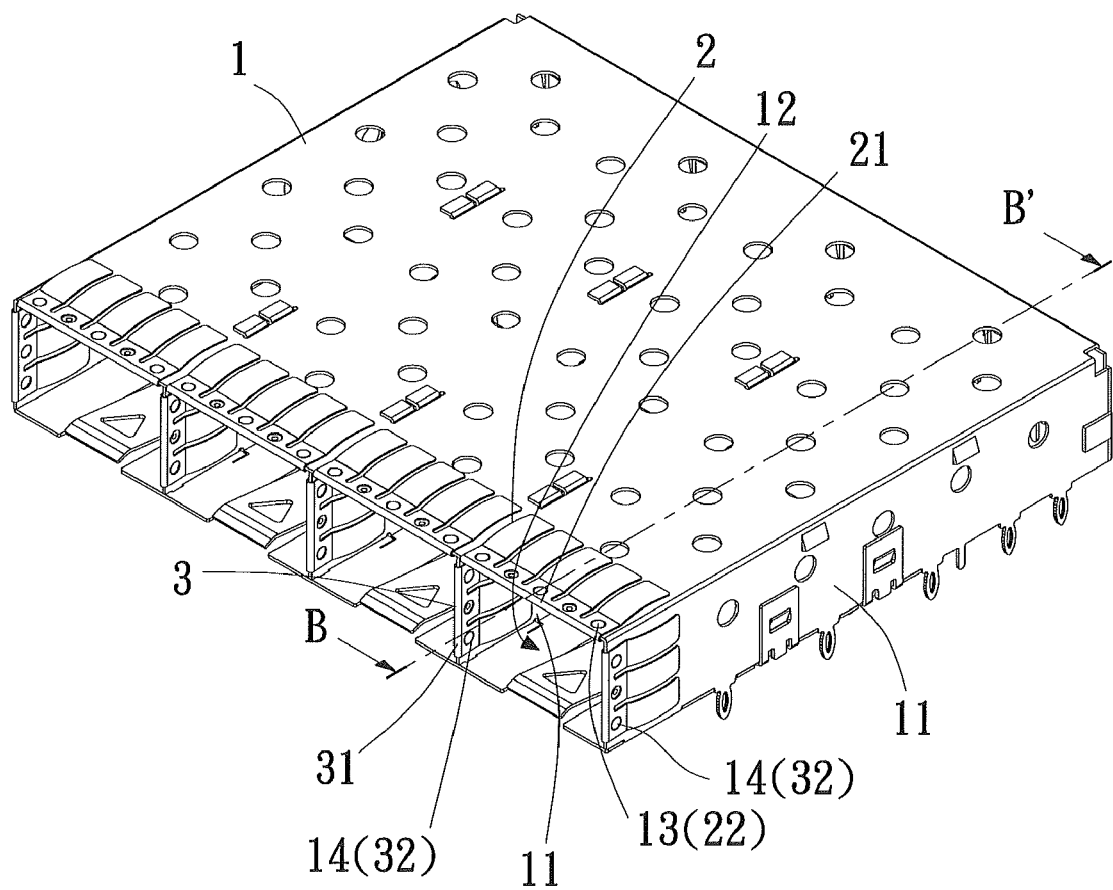
FIG. 5 is an assembled view of FIG. 4.
Figure 6:
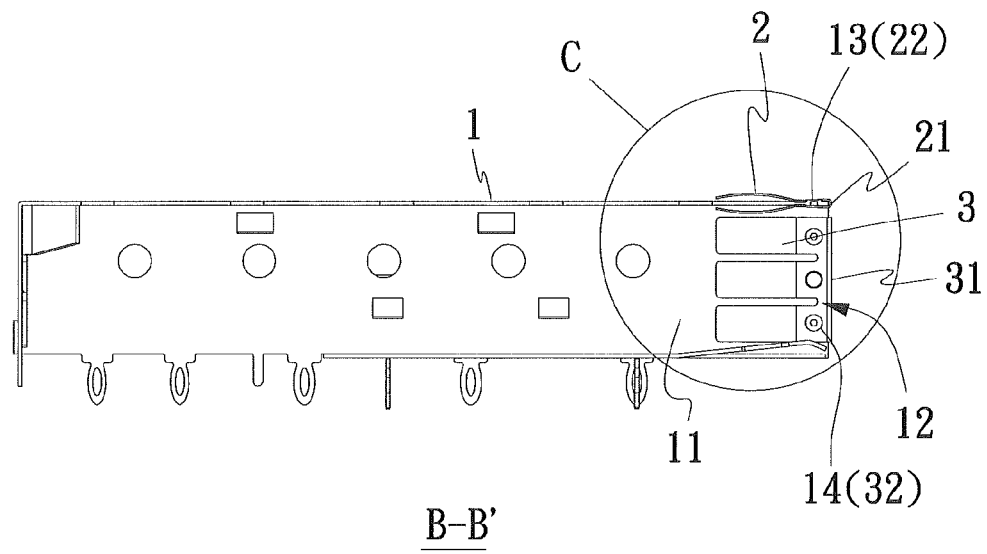
FIG. 6 is a sectional view taken along line B-B' of FIG. 5.
Figure 7:
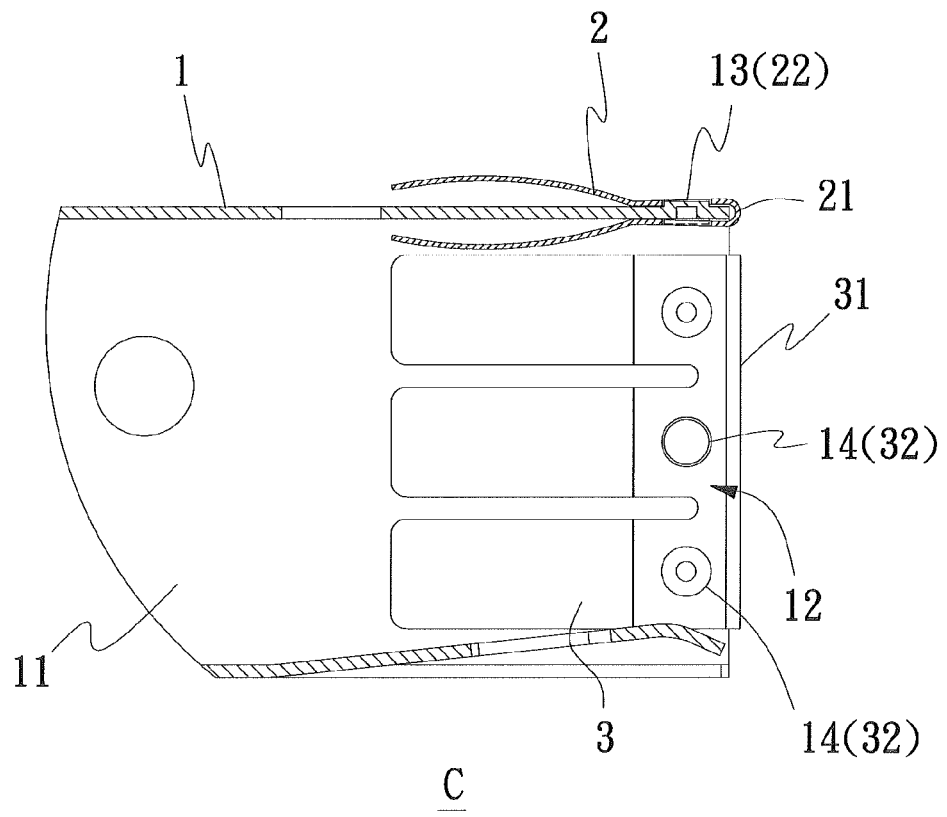
FIG. 7 is an enlarged view of the circled area C of FIG. 6.

Please refer to FIGS. 4 and 5 that are exploded and assembled perspective views, respectively, of a housing structure for pluggable transceiver module according to a first embodiment of the present invention; and to FIGS. 6 and 7 that are sectional view taken along line A-A' of FIG. 5 and enlarged view of the circled area C of FIG. 6, respectively. As shown, the housing structure for pluggable transceiver module in the first embodiment includes a case 1, a plurality of first elastic-leaf members 2, and a plurality of second elastic-leaf members 3.

The case 1 has an open end and is internally provided with a plurality of vertical partitioning plates 11 to thereby define a plurality of receiving zones 12 in the case 1. Each of the receiving zones 12 has an open end corresponding to the open end of the case 1. A plurality of first protrusions 13 is provided on an outer and an inner side of a free edge at the open end of the case 1. The first protrusions 13 provided on the outer side and the inner side of the free edge can be the same or different in number, and can be arranged in one-to-one correspondence or in staggered relation with one first protrusion 13 provided at each of two diagonally opposite corners at the outer and the inner side of the free edge. Each of the partitioning plates 11 has a free end at the open end of the case 1. A plurality of second protrusions 14 is provided on two opposite sides of the free end of each of the partitioning plates 11. The second protrusions 14 provided on the two opposite sides of the free end can be the same or different in number, and can be arranged in one-to-one correspondence or in staggered relation with one second protrusion 14 provided at each of two diagonally opposite corners at the free end of the partitioning plate 11.

The first elastic-leaf members 2 are assembled to the free edge of the case 1. Each of the first elastic-leaf members 2 has an end formed into a clamping section 31 for clamping to the free edge of the case 1. And, each of the clamping sections 21 is provided with a plurality of retaining holes 22 for engaging with the first protrusions 13.

The second elastic-leaf members 3 are assembled to the free ends of the partitioning plates 11. Each of the second elastic-leaf members 3 has an end formed into a clamping section 31 for clamping to the free ends of the partitioning plates 11. And, each of the clamping sections 31 is provided with a plurality of retaining holes 32 for engaging with the second protrusions 14.

To assemble the first elastic-leaf members 2 and the second elastic-leaf members 3 to the case 1, simply clamp the clamping sections 21 of the first elastic-leaf members 2 to the free edge of the case 1 and engage the retaining holes 22 on the clamping sections 21 with the first protrusions 13 provided on the upper and lower sides of the free edge, and then clamp the clamping sections 31 of the second elastic-leaf members 3 to the free ends of the partitioning plates 11 and engage the retaining holes 32 on the clamping sections 31 with the second protrusions 14 provided on the two opposite sides of the free ends. In this manner, the first elastic-leaf members 2 and the second elastic-leaf members 3 can be easily but securely assembled to the free edge of the case 1 and the free ends of the partitioning plates 11, respectively, without the need of spot welding and without the risk of separating from the case 1 and the partitioning plates 11.

Figure 8:
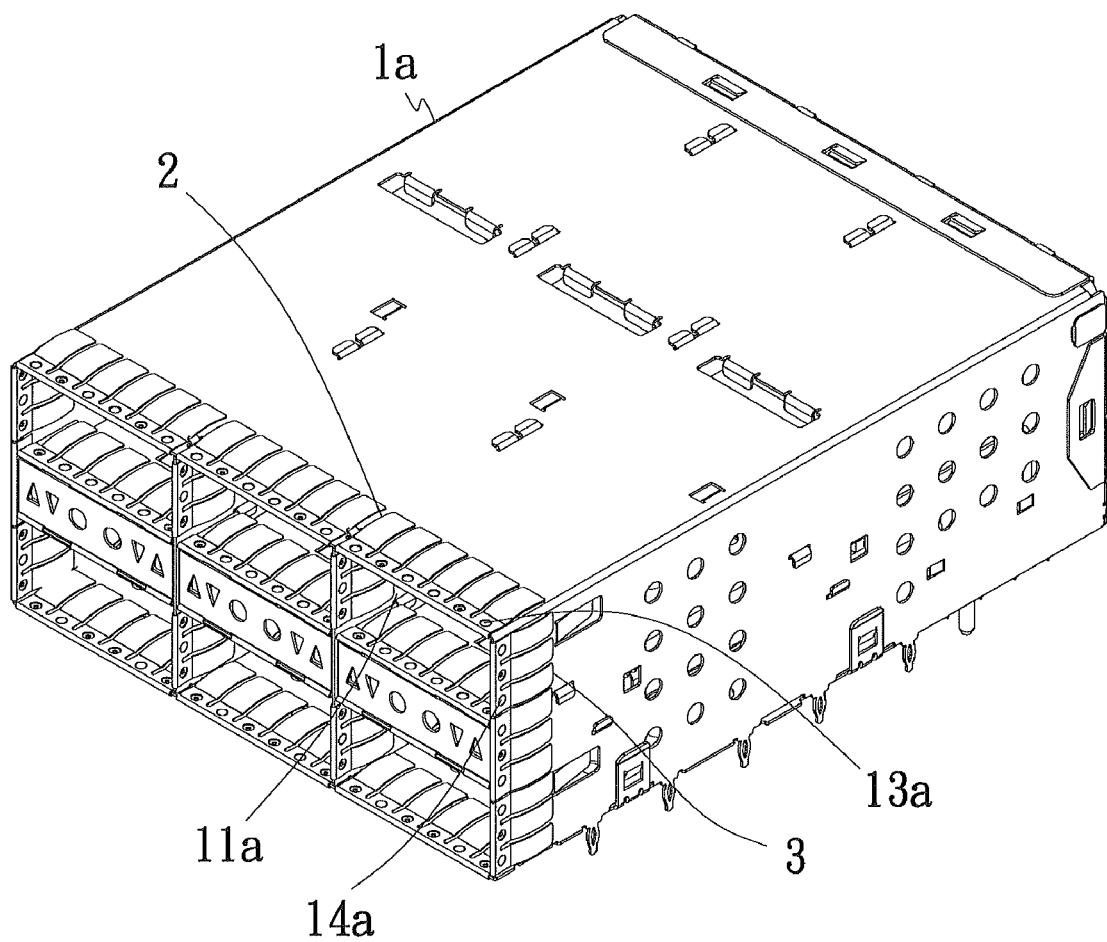
FIG. 8 is a perspective view of a housing structure for pluggable transceiver module according to a second embodiment of the present invention.

FIG. 8 is a perspective view of a housing structure for pluggable transceiver module according to a second embodiment of the present invention. As shown, the housing structure in the second embodiment is generally structurally similar to the first embodiment, except for a two-level case 1a. Each level of the case 1a is provided with partitioning plates 11a, first protrusions 13a, and second protrusions 14a, so that the first and the second elastic-leaf members 2, 3 can be easily and securely clamped to the two-level case 1a and the partitioning plates 11a via the first protrusions 13a and the second protrusions 14a, respectively.

The present invention is novel and improved because it is provided with the first and the second protrusions to enable easy and secure assembling of the first and the second elastic-leaf members to the case and the partitioning plates. And, it is anticipated products derived from the present invention will satisfy the market demands, making the present invention industrially valuable and practical for use.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A housing structure for pluggable transceiver module, comprising:

a case having an open end and being internally provided with a plurality of vertical partitioning plates to define a plurality of receiving zones therein, and each of the receiving zones having an open end corresponding to the open end of the case; a plurality of first protrusions being provided on an upper and a lower side of a free edge at the open end of the case, and a plurality of second protrusions being provided on two opposite sides of a free end of each of the partitioning plates at the open end of the case;

a plurality of first elastic-leaf members for assembling to the free edge of the case; each of the first elastic-leaf members having an end formed into a clamping section for clamping to the free edge of the case, and the clamping section being provided with a plurality of retaining holes for engaging with the first protrusions; and a plurality of second elastic-leaf members for assembling to the free ends of the partitioning plates; each of the second elastic-leaf members having an end formed into a clamping section for clamping to the free ends of the partitioning plates, and the clamping section being provided with a plurality of retaining holes for engaging with the second protrusions.

2. The housing structure for pluggable transceiver module as claimed in claim 1, wherein the first protrusions are provided on the upper side and the lower side of the free edge of the case in one-to-one correspondence.

3. The housing structure for pluggable transceiver module as claimed in claim 1, wherein the first protrusions are provided on the upper side and the lower side of the free edge of the case in staggered relation.

4. The housing structure for pluggable transceiver module as claimed in claim 1, wherein the second protrusions are provided on the two opposite sides of the free end of each of the partitioning plates in one-to-one correspondence.

5. The housing structure for pluggable transceiver module as claimed in claim 1, wherein the second protrusions are provided on the two opposite sides of the free end of each of the partitioning plates in staggered relation.

* * * * *